United States Patent [19]

Zamzow

[11] Patent Number: 4,958,875
[45] Date of Patent: Sep. 25, 1990

[54] TRUCK POCKET RAIL ATTACHMENT

[76] Inventor: Larry A. Zamzow, 14000 Renaissance Ct., Apt. 2028-0, Austin, Tex. 78728

[21] Appl. No.: 272,062

[22] Filed: Nov. 14, 1988

[51] Int. Cl.⁵ .................... B62D 33/02; B62D 33/077

[52] U.S. Cl. ........................................ 296/32; 296/34; 296/36; 248/503; 410/110

[58] Field of Search ................. 296/3, 32, 34, 36, 43; 105/379, 380, 382; 248/499, 503; 410/101, 106, 108, 110, 116

[56] References Cited

U.S. PATENT DOCUMENTS

| | | | |
|---|---|---|---|
| 1,072,516 | 9/1913 | Shields | 105/382 |
| 3,351,356 | 11/1967 | Clark et al. | 410/110 |
| 3,421,726 | 1/1969 | Getter | 296/43 X |
| 3,860,209 | 1/1975 | Strecker | 410/116 |
| 4,400,856 | 8/1983 | Tseng | 410/116 X |
| 4,444,427 | 4/1984 | Martin | 296/3 X |
| 4,604,013 | 8/1986 | Elwell et al. | 410/110 X |
| 4,815,787 | 3/1989 | Hale | 296/43 X |

Primary Examiner—Margaret A. Focarino
Assistant Examiner—Andrew C. Pike
Attorney, Agent, or Firm—Leon Gilden

[57] ABSTRACT

A rail attachment apparatus is set forth for use in combination with pockets formed within the side walls of a truck bed. The pockets are formed with side walls of a predetermined height. The apparatus includes an upper post integrally secured to a positioning plate overlying an opening defining the pocket with a threaded rod extending therethrough. The threaded rod extends downwardly through a depth post into threaded engagement with a latch plate integrally secured to the depth post. The latch plate is formed of a generally rectangular planar configuration with rounded corners for positioning within the pocket and rotated ninety degrees after initial positioning to engage underlying edges of the pocket walls whereupon tightening by use of an overlying threaded fastener, the assembly grasps the pocket walls and enables the depth post to be telescopingly received within the upper post to secure the latch plate in position.

3 Claims, 1 Drawing Sheet

U.S. Patent
Sep. 25, 1990
4,958,875
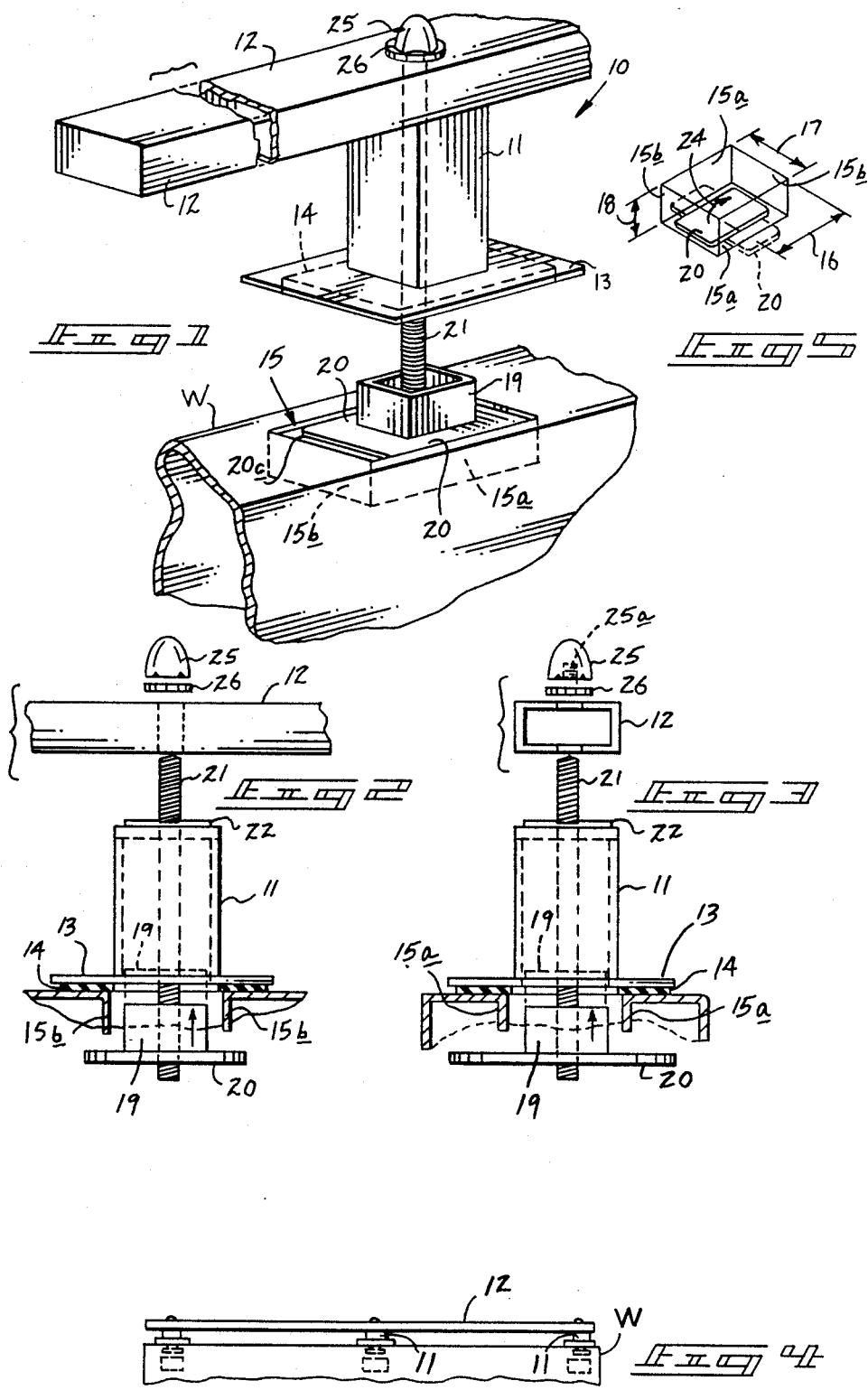

TRUCK POCKET RAIL ATTACHMENT

BACKGROUND OF THE INVENTION

1. Field of the Invention

The field of invention relates to rail attachment apparatus for use with truck bodies, and more particularly pertains to a new and improved rail attachment apparatus which includes a plurality of latch mechanisms positionable within the pockets of a truck body for securement of elongate rail thereon. Advantages include the absence of holes to be drilled in the pickup as well as ease of installation. Simplicity of construction effects an extended useful life of the apparatus.

2. Description of the Prior Art

The use of stakes secured to truck bodies is well known in the prior art. Traditionally, the structures have included various organizations of typically complex construction and organization in order to provide an effective cooperative relationship with an associated truck body. An example is set forth in U.S. Pat. No. 1,368,907 to Dymock utilizing a spring-biased member mountable within a loop of a truck body that incorporates an underlying handle associated with the pocket locking apparatus that is rotatable in 180 degrees increments to lock and unlock the associated organization. The Dymock patent is of interest relative to a stake positioning apparatus in combination with a truck body, but is of a relatively complex organization with respect to the instant invention.

U.S. Pat. No. 2,771,317 to Dohrman utilizes separate threaded fasteners and associated bracketry for bracing a truck body in conjunction with a plurality of side braces. The Dohrman patent is cited of interest relative to the use of threaded fasteners in combination with truck bodies.

U.S. Pat. No. 8,595,125 to Jacobs sets forth a tie-in apparatus for use with pickup trucks that is positioned within the pockets thereof that employs an axially coacting wedge threadedly positionable along an extending threaded shaft positioned within the respective pockets of the truck bed. The Jacobs patent utilizes the coaxially acting wedge in cooperation with a plurality of elongate friction detents to secure the apparatus within the pocket of the pickup truck bed.

U.S. Pat. No. 3,841,695 to Woodward sets forth an adapter positionable within a truck pocket utilizing a coaxially positionable wedge in cooperation with a plurality of looking members to lock the stake adapter from the associated pocket.

U.S. Pat. No. 4,219,229 to Ciocan utilizes a rotatable stanchion to position an extending leg within a cargo bed body and secure the same thereto.

As such, it may be appreciated that there continues to exist a need for a new and improved truck pocket rail attachment that combines the features of durability, ease of use, and effectiveness of construction, and in this respect the present invention substantially fulfills this need.

SUMMARY OF THE INVENTION

In view of the foregoing disadvantages inherent in the known types of truck pocket rails attachment apparatus now present in the prior art, the present invention provides a truck pocket rail attachment apparatus wherein the same may be readily attached and removed, as desired, from an associated truck body during use. As such, the general purpose of the present invention, which will be described subsequently in greater detail, is to provide a new and improved truck pocket rail attachment apparatus which has all the advantages of the prior art rail attachment apparatus and none of the disadvantages.

To attain this, the present invention comprises a series of elongate upper post for attachment of a longitudinal rail wherein the upper post has attached thereunder a positioning plate. A threaded rod threadedly engaged with the upper post extends through the upper post and positioning plate as a first member and thereunder to a telescopingly receivable depth post and attached latch plate. The latch plate is formed with rounded corners avoiding binding of the plate within an associated truck pocket.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will for the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar a they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck pocket rail attachment apparatus which has all the advantages of the prior art truck pocket rail attachment apparatus and none of the disadvantages.

It is another object of the present invention to provide a new and improved truck pocket rail attachment apparatus which may be easily and efficiently manufactured and marketed.

It is a further object of the present invention to provide a new and improved truck pocket rail attachment apparatus which is of a durable and reliable construction.

Still yet another object of the present invention is to provide a new and improved truck pocket rail attachment apparatus which provides in the apparatuses and methods of the prior art some of the advantages thereof, while simultaneously overcoming some of the disadvantages normally associated therewith.

Still another object of the present invention is to provide a new and improved truck pocket rail attachment apparatus comprised of an upper portion and secured by means of a threaded rod to a lower portion for enabling attachment and disengagement of a truck body's pocket walls.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is a side orthographic view taken in elevation of the instant invention subsequent to a ninety degree rotation of the latch plate relative to the truck body pocket.

FIG. 3 is an orthographic end view of the instant invention subsequent to a ninety degree rotation of the latch plate relative to the truck body pocket.

FIG. 4 is a orthographic view taken in elevation of the rail attachment apparatus secured to an associated truck body side wall.

FIG. 5 is an isometric illustration of the latch plate rotatively positionable within an associated pocket of a truck bed wall.

DESCRIPTION OF THE PREFERRED EMBODIMENT

With reference now to the drawings, and in particular to FIGS. 1 to 4 thereof, a new and improved truck pocket rail attachment apparatus embodying the principles and concepts of the present invention and generally designated by the reference numeral 10 will be described.

More specifically, it will be noted that the truck pocket rail attachment apparatus 10 essentially comprises an upper vertical hollow post 11 of generally parallelepiped configuration with a top wall for securement of an elongate horizontal rail 12 orthogonally thereto. It is contemplated, as noted in FIG. 4, that a series of the upper post 11 will secure a single elongate rail 12 along a respective truck body wall "W". Orthogonally, integrally, and fixedly secured to the lower terminal end of upper post 11 is a generally rectangular positioning plate 13 formed with a resilient polymeric padding 14 to an underlying surface in surrounding overlying relationship to the rectangular pocket opening of pocket 15. The pocket 15 is formed of side walls 15a and end walls 15b wherein the sidewalls 15a are of a greater lineal length than end walls 15b to define a pocket length 16 and pocket width 17 respectively. The walls are of a height defined by arrow is less than the height defined by a depth post 19. The depth post 19 has integrally secured to a lower terminal end thereof a latch plate 20 formed with rounded corners 20a to minimize damage and binding to interior surfaces of the truck's wall pockets during installation. The exterior configuration of depth post 19 is complementary to the interior cavity defined by post 11 for depth post 19 to be telescopingly received within post 11 upon assembly of the apparatus to the pocket 15.

An elongate threaded rod 21 is threadedly directed through a top wall and extends longitudinally and axially downwardly through the upper post 11 positioning plate 13, depth post 19, and threadedly through a threaded aperture in latch plate 20. A detent washer 22 of well known construction maintains the threaded rod 21 in predetermined orientation relative to the upper post 11 to maintain orientation of the threaded rod 21 to the post 11 prior to the securement and threading of the internally threaded protective acorn nut 25 thereon in conjunction with the washer 26 when uniting the assembly together. The latch plate 20 is of a generally rectangular configuration defining an area substantially equal to that of the opening defined by the rectangular pocket 15 wherein the latch plate 20 is inserted through the opening and downwardly past the side and end walls 15a and 15b respectively of the pocket 15. Once past the lower terminal edge of the side end walls of the pocket 11, the latch plate 20 is rotated 90 degrees per indicator arrow 24. Upon lifting of the threaded rod upwardly for frictional securement of the latch plate 20 to lower terminal edges of pocket 15, the latch plate is inhibited from turning and therefore will extend beyond the side walls 15a. The depth post 19 is telescopingly received within post 11 for locking registration of the depth post 19 and associated latch plate 20 thereto. Upon threading of the protective nut 25 onto the upper terminal end of the threaded rod 21 subsequent to positioning of rail 12, the side walls of the pocket 15 are firmly and securely grasped between the positioning plate 13 and the latch plate 20.

As illustrated in FIGS. 2 and 3, the upper post and depth post, as well as the respectively associated positioning plate and latch plate, are formed with coaxial bores for slidingly accepting the threaded rod therethrough. This maintains the alignment of the upper post and the lower portion including the depth post and latch plate in alignment relative to one another when the acorn nut 25 including internal threads 25a is threadedly secured to the upper terminal end of the threaded rod 21.

Alternatively, the rod 21 could be fixedly secured to latch plate 20 to effect rotation of the plate 20 when positioned in pocket 15.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by Letters Patent of the United States is as follows:

1. A truck pocket rail attachment apparatus for use in combination with sidewalls of a truck bed, said sidewalls including a plurality of spaced pockets formed in the sidewalls with each pocket including a rectangular opening and further including a cavity of rectangular cross-sectional configuration with side walls and end walls of a predetermined height, and said side walls of a greater lineal length than said end walls, said apparatus comprising, an upper portion including an upper vertical hollow post means with a top wall for positioning of an elongate horizontal rail thereon, and said upper post means including a lower terminal end integrally secured to a positioning plate means for overlying said opening, and a lower portion including a depth post of a height greater than said predetermined height, and a rectangular latch plate means integrally secured to a lower end of said depth post of an area substantially equal to said opening for rotation relative to said upper portion to engage lower terminal edges of said side walls, and connecting means for securing said horizontal rail, said upper portion, and said lower portion together.

2. A truck pocket rail attachment apparatus as set forth in claim 1 wherein said positioning plate means includes a resilient polymeric padding material secured thereunder in surrounding relationship to said hollow post means.

3. A truck pocket rail attachment apparatus as set forth in claim 2 wherein said depth post is of an external configuration substantially complementary to an internal cavity defined by said hollow post means wherein said depth post is telescopingly receivable within said hollow post means.

* * * * *